United States Patent [19]

Bond et al.

[11] 4,350,621
[45] Sep. 21, 1982

[54] ELASTOMER COMPOSITIONS FOR TIRE TREAD

[75] Inventors: Robert Bond, Staffordshire; Robert J. Blythe, Birmingham, both of England

[73] Assignee: Dunlop Limited, London, England

[21] Appl. No.: 163,278

[22] Filed: Jun. 26, 1980

Related U.S. Application Data

[63] Continuation of Ser. No. 937,121, Aug. 28, 1978, abandoned.

[30] Foreign Application Priority Data

Sep. 9, 1977 [GB] United Kingdom ............... 37824/77

[51] Int. Cl.$^3$ ..................... C08L 7/00; C08L 9/06; C08L 23/20
[52] U.S. Cl. ................ 525/237; 152/209 R
[58] Field of Search ............... 260/4 R, 5

[56] References Cited

U.S. PATENT DOCUMENTS

| | | | |
|---|---|---|---|
| 2,875,170 | 2/1959 | Ayers et al. | 260/33.6 |
| 2,906,725 | 9/1959 | Briggs et al. | 260/42.47 |
| 2,910,451 | 10/1959 | Cantwell | 525/232 |
| 2,969,341 | 1/1961 | Buckley et al. | 525/236 |
| 3,179,718 | 4/1965 | Wei et al. | 525/233 |
| 3,245,452 | 4/1966 | Scott | 152/330 |
| 3,356,764 | 12/1967 | Gentile | 525/210 |
| 3,639,323 | 2/1972 | Morrisey | 260/28.5 B |
| 4,012,344 | 3/1977 | Cohen | 260/4 |

FOREIGN PATENT DOCUMENTS

| | | |
|---|---|---|
| 1167677 | 4/1964 | Fed. Rep. of Germany . |
| 2274645 | 6/1975 | France . |
| 490792 | 8/1938 | United Kingdom . |
| 673962 | 6/1952 | United Kingdom . |
| 765762 | 1/1957 | United Kingdom . |
| 787068 | 11/1957 | United Kingdom . |
| 802460 | 10/1958 | United Kingdom . |
| 821846 | 10/1959 | United Kingdom . |
| 822621 | 10/1959 | United Kingdom . |
| 882093 | 11/1961 | United Kingdom . |
| 946224 | 1/1964 | United Kingdom . |
| 994726 | 6/1965 | United Kingdom . |
| 1007158 | 10/1965 | United Kingdom . |
| 1026914 | 4/1966 | United Kingdom . |
| 1101240 | 1/1968 | United Kingdom . |
| 1177224 | 1/1970 | United Kingdom . |
| 1501922 | 2/1978 | United Kingdom . |

*Primary Examiner*—Wilbert J. Briggs, Sr.
*Attorney, Agent, or Firm*—Stevens, Davis, Miller & Mosher

[57] ABSTRACT

Tires having good grip on wet road surfaces and low frictional resistance to rolling on the road surface have treads formed from vulcanizates of elastomer compositions comprising one or more polymers having a glass transition temperature (Tg) of minus 50° or lower blended with a non-cross-linking polymer or heavy oil. Suitable non-cross-linking polymers are polyisobutylenes, especially ones having a molecular weight of 1.06 to 1.44 million which are very effective with natural rubber, polybutadienes and/or styrene-butadiene copolymers as the low Tg polymers.

13 Claims, 14 Drawing Figures

ELASTOMER COMPOSITIONS FOR TIRE TREAD

This is a continuation of application Ser. No. 937,121 filed Aug. 28, 1978, now abandoned.

This invention relates to elastomer compositions, to vulcanised compositions obtained by vulcanising them and to tires containing said vulcanised compositions.

In designing tires for road vehicles it is normally desirable to seek maximum grip on wet road surfaces and minimum frictional resistance to rolling of the tire on the road surface. Unfortunately, the one property is, in general, improved only at the expense of the other, and in consequence the design tends to be a compromise insofar as the selection of elastomer used for the tread portion of the tire is concerned.

We have now found according to the present invention that excellent combinations of grip on wet road surfaces and rolling resistance can be obtained by using as the tread portion of tires vulcanised elastomer compositions containing a blend of a polymer having a low glass transition temperature (low Tg polymer) with a non-cross-linking polymer or a heavy oil.

Accordingly, a first aspect of the invention provides elastomer compositions comprising one or more polymers having a low glass transition temperature (as hereinbefore defined) blended with a non-cross-linking polymer or a heavy oil.

Glass transition temperature (Tg) can be measured by various known methods. In this specification it is defined as the temperature at which there is a change in the shape of a curve of volume plotted against temperature as measured by dilotometry. In the glassy state there is a lower volume coefficient of expansion than in the rubbery state, thus producing the change in shape of the curve. As used herein "low glass transition temperature" is one of minus 50° C. or lower temperature, and "high glass transition temperature" is one of ambient temperature (15° C.) or higher temperature.

As illustrated in the accompanying drawings, use of elastomer compositions of the invention in tires can provide a lower rolling resistance together with similar or even increased grip on wet road surfaces when compared with tire tread compositions adopted hitherto.

Although it is not intended that the present invention should be limited with regard to a particular theory, it is thought that, given adequate blending, the molecular chains of the polymer of low Tg are surrounded by a relatively viscous medium constituted by the molecules of the non-cross-linking polymer or heavy hydrocarbon oil, and that there results a viscous damping of the molecular chains of the former polymer.

The non-cross-linking polymer is, in general, one which is derived from ine or more monomers having only one unsaturated bond. For example, isobutylene has only one double bond in the molecule and consequently upon polymerisation the polyisobutylene produced is substantially free from unsaturation.

The non-cross-linking polymer can be, for example, polybutene, especially a polyisobutylene, or a polymer of another lower alkene. In this respect good results have been obtained using ethylene-propylene rubber (EPM rubber). It is with reference to the use of a polyisobutylene or an EPM rubber that the description hereinafter particularly relates. The polyisobutylene or EPM rubber is on the whole preferably of high molecular weight, that is a polymer having a molecular weight above 100,000, for example in the range from 250,000 to 3 million, though if tire grip on wet road surfaces is the primary consideration a relatively low molecular weight, is preferred, for example about 1000.

It is preferred that the proportions in which the low Tg polymer and the non-cross-linking polymer are present in the blends of the invention is such that the weight of the non-cross-linking polymer is not excessively greater than that of the low Tg cross-linking polymer. In general, the weight of the non-cross-linking polymer is not more than 60% of the total weight of the low Tg and non-cross-linking polymer.

Where an EPM rubber is used it can, be one containing a major proportion of ethylene. For example, the ethylene: propylene weight rates can be 60.40 or 80:20 or intermediate values. Examples of suitable commercial EPM rubbers are those sold under the trade names Dutral N and Dutral C 0054.

EPM and EPDM rubbers are disclosed in U.K. Pat. Nos. 937,421 and 1,100,153 in the name of Dunlop and in 886794 and 957104.

Where the non-cross-linking polymer is a polyisobutylene, it can, for example, be used in an amount of 40% or more (for example from 40% to 150% or from 40% to 100%) by weight of the total weight of said one or more low Tg polymers.

Cross-linking polymers having low glass transition temperatures are, for example, natural rubbers, polybutadienes, and polyisoprenes and rubbery styrene-butadiene copolymers.

There can be used to advantage in the elastomer compositions of the invention a proportion of a polymer of high glass transition temperature (high Tg polymer). Polymers having high glass transition temperatures are, for example, polymers (for example styrene-butadiene or other styrene copolymers) containing a substantial proportion of styrene. Suitable styrene copolymers, for example, are copolymers whose properties in general at ambient temperatures are such that the copolymer is to be regarded as being more resinous than elastomeric in character. Where the styrene copolymer is one consisting substantially of styrene and butadiene, examples of suitable proportions of styrene are in the range from 50 to 90%, for instance 80–90% styrene. Examples of suitable commercial resinous styrene-butadiene copolymers are those sold by Goodyear Company under the trade marks Pliolite, Pliolite 6SF and Pliolite 6SH which have styrene contents in the range 85–90% by weight. Other suitable high Tg polymers are various styrene-butadiene rubbers.

The high Tg polymer is preferably used in a minor amount by weight compared with the weight of the two major polymer components, i.e. the low Tg polymer or polymers and the non-cross-linking polymer, and usually is in an amount by weight less than that of each of said major components. For example, the high Tg polymer can be in an amount in the range from 3 to 20% (especially from 5 to 15% by weight of the total weight of the major polymer components.

The unvulcanised elastomer compositions of the first aspect of the invention can be vulcanised, for example using the procedures referred to below in the Examples, to produce vulcanised compositions which constitute a second aspect of the invention. These vulcanised compositions can, for example, be in the form of tires. Accordingly, a third aspect of the invention is tires whose tread comprises a vulcanised composition according to the second aspect of the invention.

The invention is illustrated by the following Examples in which the amounts of ingredients are amounts by weight unless stated otherwise.

In the Examples some of the ingredients are referred to simply by their trade names. The nature of those ingredients and their glass transition temperatures (as hereinbefore defined) where appropriate, is as follows:

| Trade Name | Material | Tg (°C.) |
|---|---|---|
| SMR 20 | a natural rubber | minus 70 |
| Intene NF 45 | a cis polybutadiene | minus 105 |
| LTP 1502 | a styrene-butadiene rubber comprising 23% styrene and 77% butadiene. | minus 55 |
| Pliolite 6SH | a resinous styrene-butadiene copolymer having styrene content in the range from 85% to 90% of the copolymer | 90 |
| CBS | an accelerator | |
| Arrconnox GP | an antioxidant comprising 75% BLE and 25% of a silicate | |
| I.P.P.D. | N—isopropyl-N'—phenyl-p-phenylene diamine. | |

Hyvis 30 - a low molecular weight polyisobutylene having a viscosity average molecular weight of about 1,000.
Vistonex MML 100 - a high molecular weight polyisobutylene having a viscosity average molecular weight in the range from 1,060,000 to 1,440,000.

EXAMPLE I

A natural rubber-polyisobutylene composition was obtained by blending together the following ingredients.

| | Parts |
|---|---|
| Natural Rubber | 50 |
| Polyisobutylene - Hyvis 30 | 50 |
| *Santocure (N—cyclohexyl-2-benzthiazyl sulphenamide) | 0.5 |
| Stearic acid | 1.0 |
| Zinc Oxide | 5.0 |
| Mineral Oil | 5.0 |
| *Nonox ZA (N—isopropyl-N'—phenyl paraphenylene diamine) | 0.08 |
| *Nonox BLB (50/50 condensation product of acetone and diphenylamine/carbon black) | 0.85 |
| N110 Carbon Black | 12.5 |
| N660 Carbon Black | 37.5 |
| Sulphur | 2.5 |

*Trade Marks

The resulting composition was used to tread pneumatic tires. The treaded tires were subjected to road tests, and the results obtained (referred to by the abbreviation "NR/PIB") are shown in FIGS. 1 to 4 of the accompanying drawings in comparison with the results obtained using tires (referred to respectively as T540 and T804) whose tread portions are of conventional compositions.

EXAMPLE 2

A second example of compositions of the invention is the polybutadiene-polyisobutylene composition obtained by blending together the following ingredients.

| | Parts |
|---|---|
| Polybutadiene (Intene N.F. 45) | 50.00 |
| High molecular weight polyisobutylene - Vistonex MML 100. | 50.00 |
| LTP 1502 (SBR) | 15.00 |
| CBS accelerator | 0.50 |
| Sulphur | 2.50 |
| Zinc oxide | 5.00 |
| Stearic acid | 1.00 |
| Arrconnox GP - antioxidant | 1.00 |
| Mineral Oil | 5.00 |
| N110 black | 12.50 |
| N660 black | 37.50 |

EXAMPLE 3

A third example of compositions of the invention is another polybutadiene-polyisobutylene composition obtained by blending together the following ingredients.

| | |
|---|---|
| Polybutadiene (Intene NF 45) | 50.00 |
| High molecular weight polyisobutylene - Vistonex MML 100 | 50.00 |
| Pliolite 6SH | 5.00 |
| Sulphur | 2.50 |
| Zinc oxide | 5.00 |
| Stearic acid | 1.00 |
| Arrconnox GP | 1.00 |
| Mineral oil | 5.00 |
| N110 black | 12.50 |
| N660 black | 37.50 |

Examples 4 to 8 below relate to other elastomeric compositions of the invention. In each of these Examples a list of the ingredients blended together is given. The resulting composition was in each case vulcanised at 140° C. for 40 minutes, and the mechanical properties and power loss figures for the resulting vulcanisate are given.

EXAMPLE 4

| | | Parts | | |
|---|---|---|---|---|
| LTP 1502 | | 90.00 | | |
| Pliolite 6SH | | 10.00 | | |
| Hyvis 30 | | 50.00 | | |
| Zinc oxide | | 2.50 | | |
| Stearic acid | | 1.00 | | |
| MBS | | 0.80 | | |
| Sulphur | | 1.60 | | |
| PVI-50 | | 0.20 | | |
| Arrconnox GP | | 1.33 | | |
| IPPD | | 0.75 | | |
| N234 black | | 60.00 | | |
| Tensile strength | MPa | 8.6 | | |
| Stress @ 300% | MPa | 6.7 | | |
| Elongation at break | % | 350 | | |
| Hardness | IRHD | 60.9 | | |
| Resilience @ 50° C. | % | 33.9 | | |
| Power loss | | 50° C. | 80° C. | 100° C. |
| Elastic modulus (E') | MPa | 3.85 | 2.02 | 1.61 |
| Loss modulus (E") | MPa | 1.04 | 0.55 | 0.46 |
| Loss factor (E"/E') | | 0.270 | 0.273 | 0.285 |
| E"/(E*)$^2$ | MPa$^{-1}$ | 0.0654 | 0.1255 | 0.1639 |

EXAMPLE 5

| | Parts |
|---|---|
| SMR 20 | 50.00 |
| Vistonex MML 100 | 50.00 |
| LTP 1502 | 15.00 |
| Zinc oxide | 5.00 |
| Stearic acid | 1.00 |

-continued

|  |  |  |  |  |
|---|---|---|---|---|
| Sulphur |  | 2.50 |  |  |
| CBS |  | 0.50 |  |  |
| Arrconnox GP |  | 1.00 |  |  |
| IPPD |  | 1.00 |  |  |
| Paraffin wax |  | 1.00 |  |  |
| Mineral oil |  | 5.00 |  |  |
| N110 black |  | 25.00 |  |  |
| N660 black |  | 25.00 |  |  |
| Tensile strength | MPa | 26.5 |  |  |
| Stress @ 300% | MPa | 8.6 |  |  |
| Elongation @ break | % | 610 |  |  |
| Hardness | IRHD | 55.6 |  |  |
| Resilience @ 50° C. |  | 75.0 |  |  |
| Power loss |  | 50° C. | 80° C. | 100° C. |
| Elastic modulus (E') | MPa | 5.69 | 3.61 | 3.55 |
| Loss modulus (E") | MPa | 0.34 | 0.27 | 0.26 |
| Loss factor (E"/E') |  | 0.059 | 0.075 | 0.074 |
| E"/(E*)$^2$ | MPa$^{-1}$ | 0.0104 | 0.0207 | 0.0208 |

EXAMPLE 6

|  |  | Parts |  |  |
|---|---|---|---|---|
| SMR 20 |  | 50.00 |  |  |
| Vistonex MML 100 |  | 50.00 |  |  |
| Pliolite 6SH |  | 5.00 |  |  |
| Zinc oxide |  | 5.00 |  |  |
| Stearic acid |  | 1.00 |  |  |
| Sulphur |  | 2.50 |  |  |
| CBS |  | 0.50 |  |  |
| Arrconnox GP |  | 1.00 |  |  |
| IPPD |  | 1.00 |  |  |
| Paraffin wax |  | 1.00 |  |  |
| Mineral oil |  | 5.00 |  |  |
| N110 black |  | 25.00 |  |  |
| N660 black |  | 25.00 |  |  |
| Tensile strength | MPa | 11.9 |  |  |
| Stress @ 300% | MPa | 9.0 |  |  |
| Elongation @ break | % | 380 |  |  |
| Hardness | IRHD | 64.6 |  |  |
| Resilience @ 50° C. | % | 61.4 |  |  |
| Power loss |  | 50° C. | 80° C. | 100° C. |
| Elastic modulus (E') | MPa | 6.21 | 5.16 | 4.91 |
| Loss modulus (E") | MPa | 0.86 | 0.57 | 0.48 |
| Loss factor (E"/E') |  | 0.138 | 0.111 | 0.097 |
| E"/(E*)$^2$ | MPa$^{-1}$ | 0.0218 | 0.0212 | 0.0195 |

EXAMPLE 7

|  |  | Parts |  |  |
|---|---|---|---|---|
| SMR 20 |  | 30.00 |  |  |
| Intene NF 45 |  | 40.00 |  |  |
| Vistonex MML 100 |  | 17.00 |  |  |
| LTP 1502 |  | 13.00 |  |  |
| Zinc oxide |  | 4.00 |  |  |
| Stearic acid |  | 2.00 |  |  |
| Sulphur |  | 1.50 |  |  |
| CBS |  | 1.50 |  |  |
| PVI-50 |  | 0.40 |  |  |
| Arrconnox GP |  | 1.00 |  |  |
| N326 black |  | 50.00 |  |  |
| Tensile strength | MPa | 15.8 |  |  |
| Stress @ 300% | MPa | 11.8 |  |  |
| Elongation @ break | % | 370 |  |  |
| Hardness | IRHD | 68.9 |  |  |
| Resilience @ 50° C. | % | 66.2 |  |  |
| Power loss |  | 50° C. | 80° C. | 100° C. |
| Elastic modulus (E') | MPa | 6.64 | 6.15 | 6.08 |
| Loss modulus (E") | MPa | 0.73 | 0.53 | 0.48 |
| Loss factor (E"/E') |  | 0.109 | 0.086 | 0.078 |
| E"/(E*)$^2$ | MPa$^{-1}$ | 0.0164 | 0.0138 | 0.0128 |

It will be seen that in this Example the polyisobutylene is present in an amount of about 20% by weight of the three low Tg polymers, exemplifying the use of polyisobutylene in amounts in the range from 10% to 40%, for example 15 to 25% with blends of two, three or more such polymers having low Tg values.

EXAMPLE 8

This is an Example of the use of an EPM rubber as non-cross-linking polymers, in which Example 7 was repeated except that 17 parts of EPM rubber was used instead of the 17 parts of Vistonex. The EPM rubber used was that sold under the trade name Dutral N (sold by Montedison) which has an ethylene: propylene rates by weight of 60.40 and a viscosity average molecular weight of about 300,000.

The physical properties and power loss figures for the resulting vulcanisate are given below.

|  |  | Parts |  |  |
|---|---|---|---|---|
| Tensile strength | Mpa | 14.8 |  |  |
| Stress @ 300% | MPa | 11.6 |  |  |
| Elongation @ break | % | 360 |  |  |
| Hardness | IRHD | 69.3 |  |  |
| Resilience @ 50° C. | % | 66.6 |  |  |
| Power loss |  | 50° C. | 80° C. | 100° C. |
| Elastic modulus (E') | MPa | 7.09 | 6.50 | 6.35 |
| Loss modulus (E") | MPa | 0.79 | 0.64 | 0.57 |
| Loss factor (E"/E') |  | 0.111 | 0.098 | 0.089 |
| E"/(E*)$^2$ | Mpa$^{-1}$ | 0.0155 | 0.0149 | 0.0139 |
| Specific gravity |  | 1.116 |  |  |

The compositions of Examples 1 to 7 have been tested to assess their wet grip and rolling resistance properties on a road surface. The compositions of Examples 2 to 7 were used as the tread compounds of model cross-ply tires of size 2.25-8 (dimensions in inches). These model tires were subjected to two tests as follows.

Grip on a wet Delugrip road surface (Delugrip is a Trade Mark) was measured using variable speed internal drum machine (VSIDM) described in a paper by G. Lees and A. R. Williams in Journal of the Institute of the Rubber Industry, Vol. 8, No. 3, June 1974. Measurements of the wet grip were made for both peak and locked wheel friction at speeds of 16, 32, 48, 64, 80 and 96 kg/hour(10,20, 30, 40 50 and 60 mph respectively). Rolling resistance was measured using the dynamics machine described in U.K. Pat. No. 1,392,033. Measurements were made at speeds of 20, 40, 60 and 80 km/hour.

The composition of Example 1 was used as the tread compound of model tires of size 2.25-8 cross-ply and of 155R 13 CB 116 radial tires. The grip (locked wheel friction) of the model tires on a wet Delugrip road surface was measured using the varible speed internal drum machine referred to above. For the radial tires their grip (locked wheel friction and peak friction) was measured on a Dorset pebble road surface as detailed in FIG. 2 of the accompanying drawings, their rolling resistance by means of the low speed uniformity machine described in THE ENGINEER APR. 27, 1962.

Figure 1:
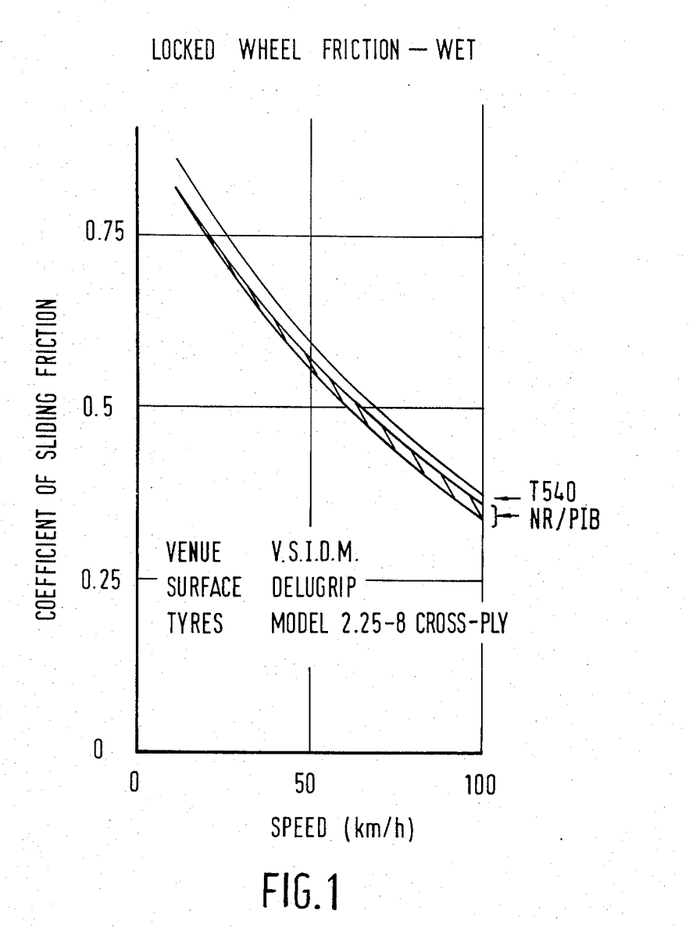
Figure 2:
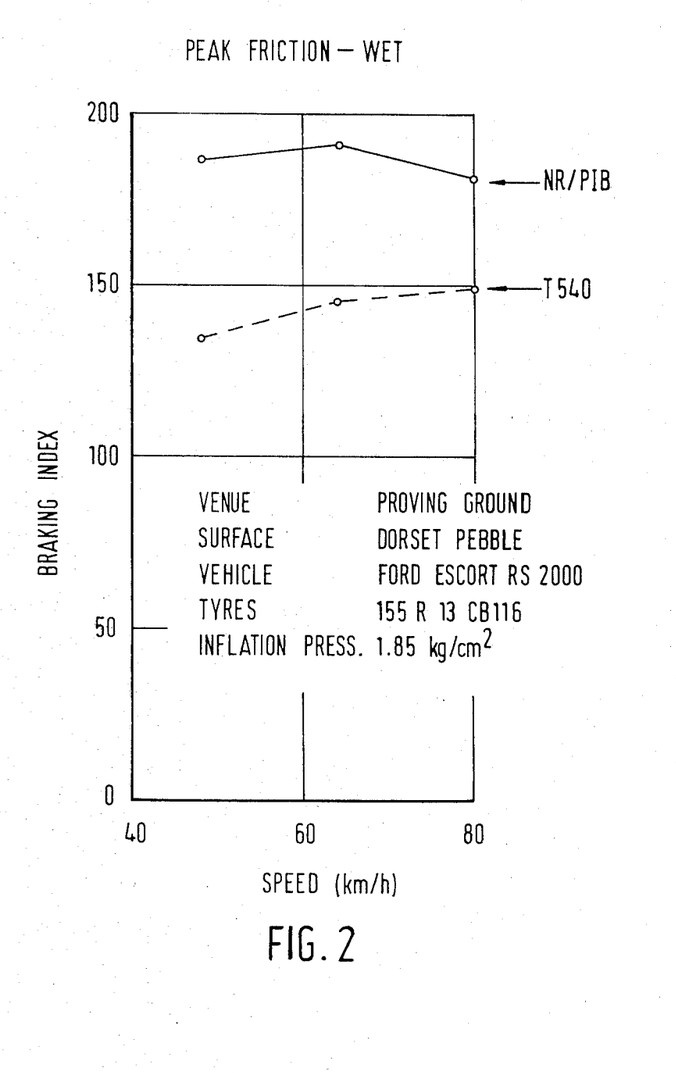
Figure 3:
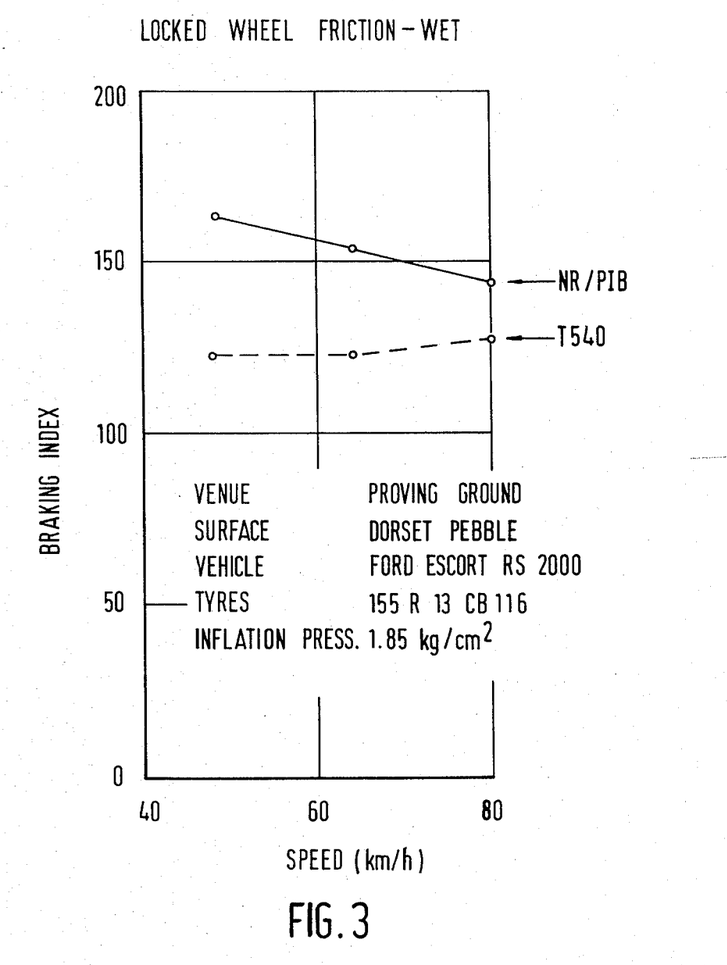
Figure 4:
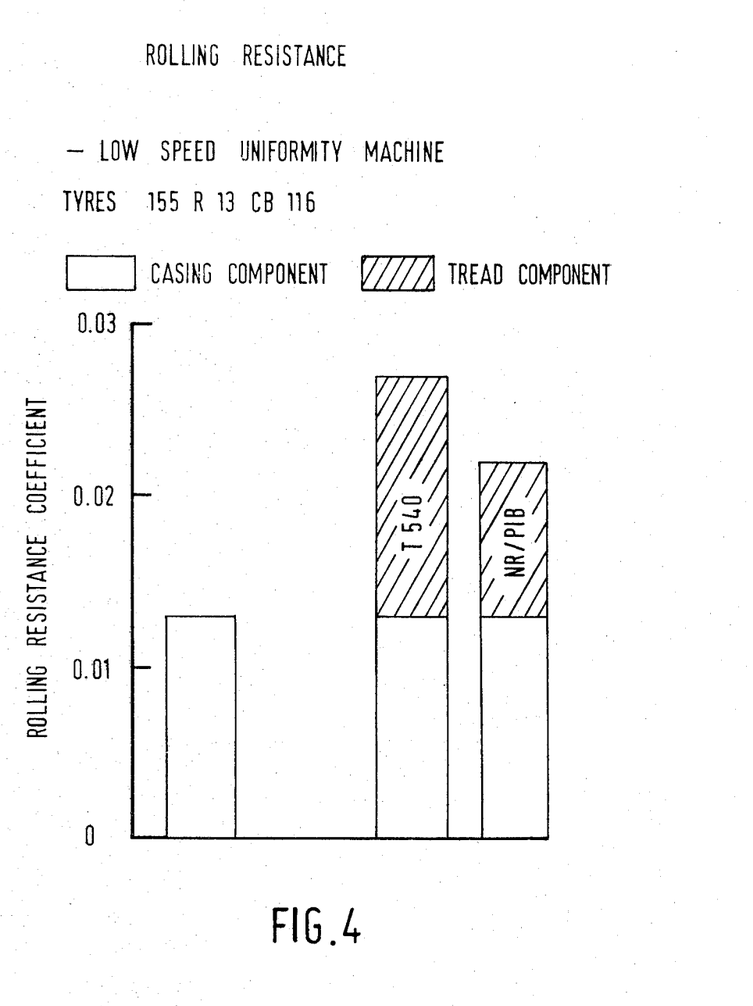
Figure 5:
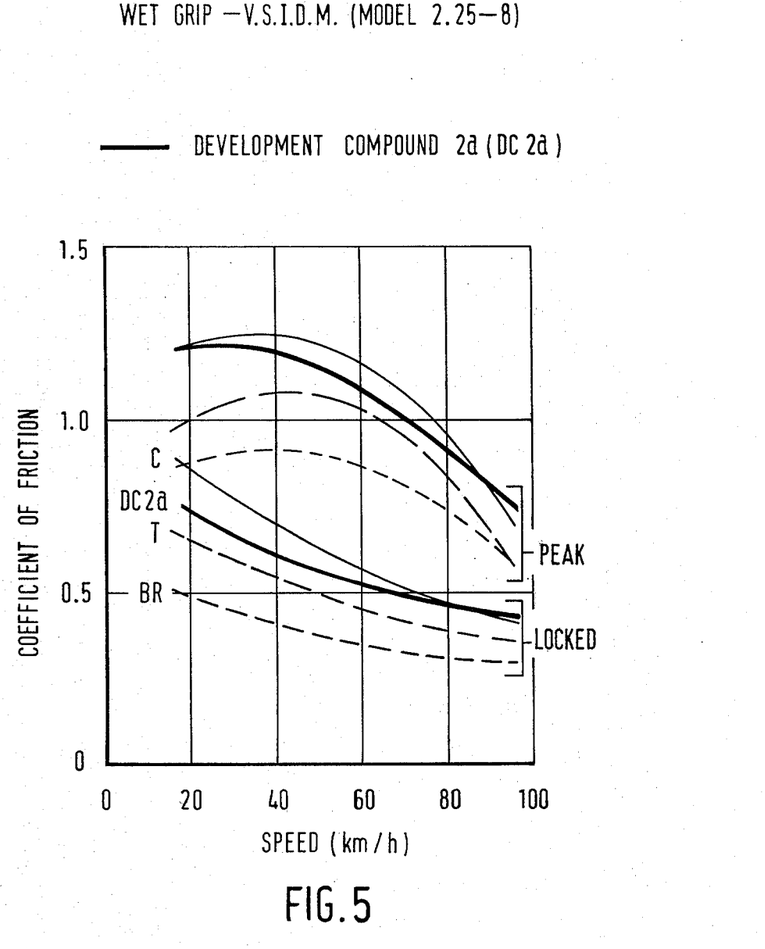
Figure 6:
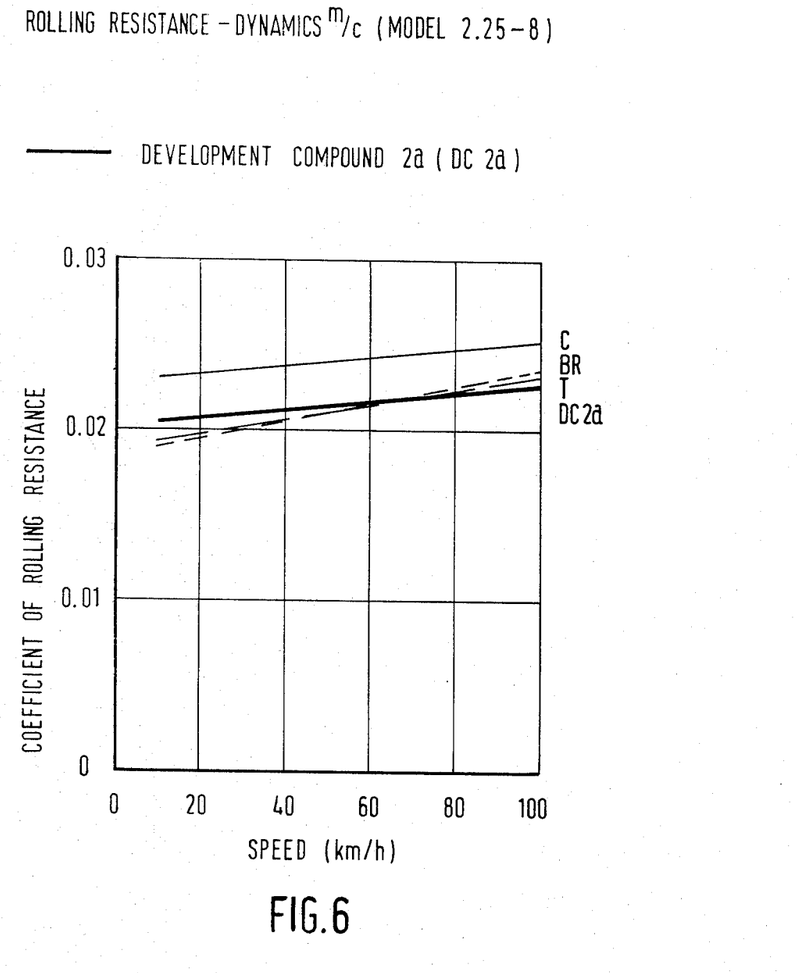
Figure 7:
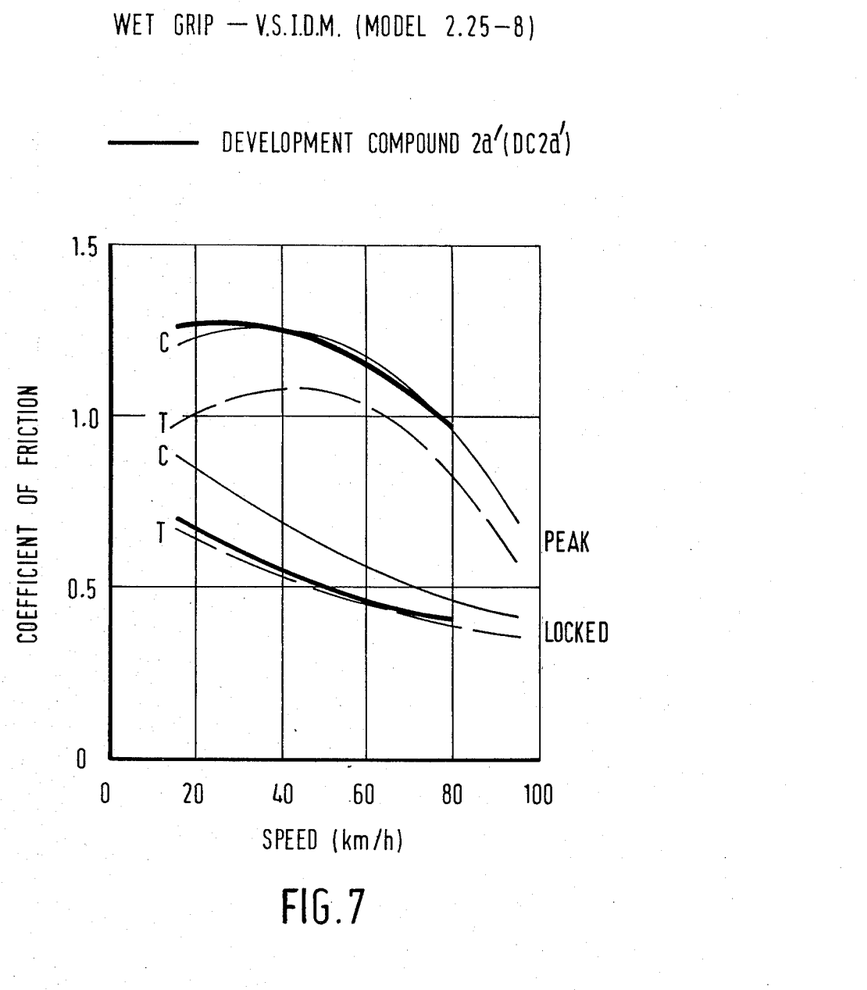
Figure 8:
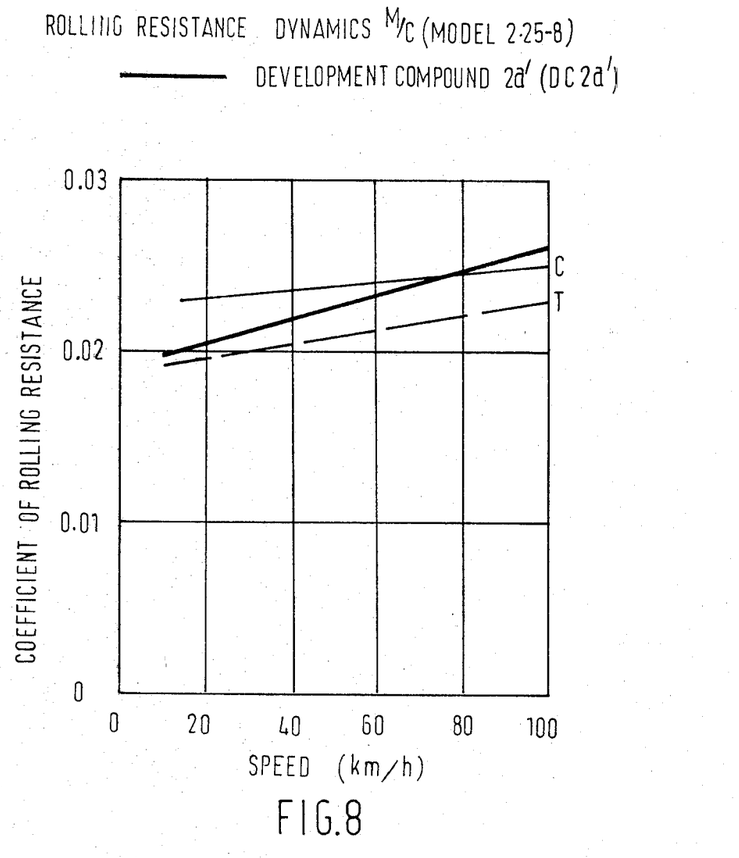
Figure 9:
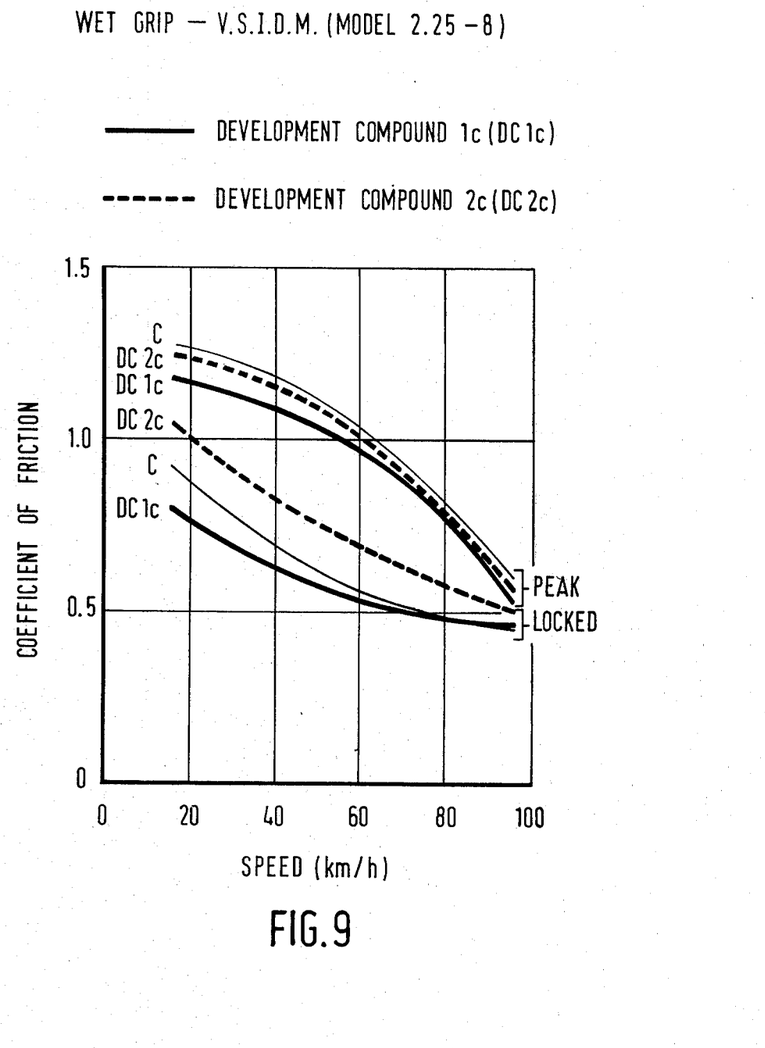
Figure 10:
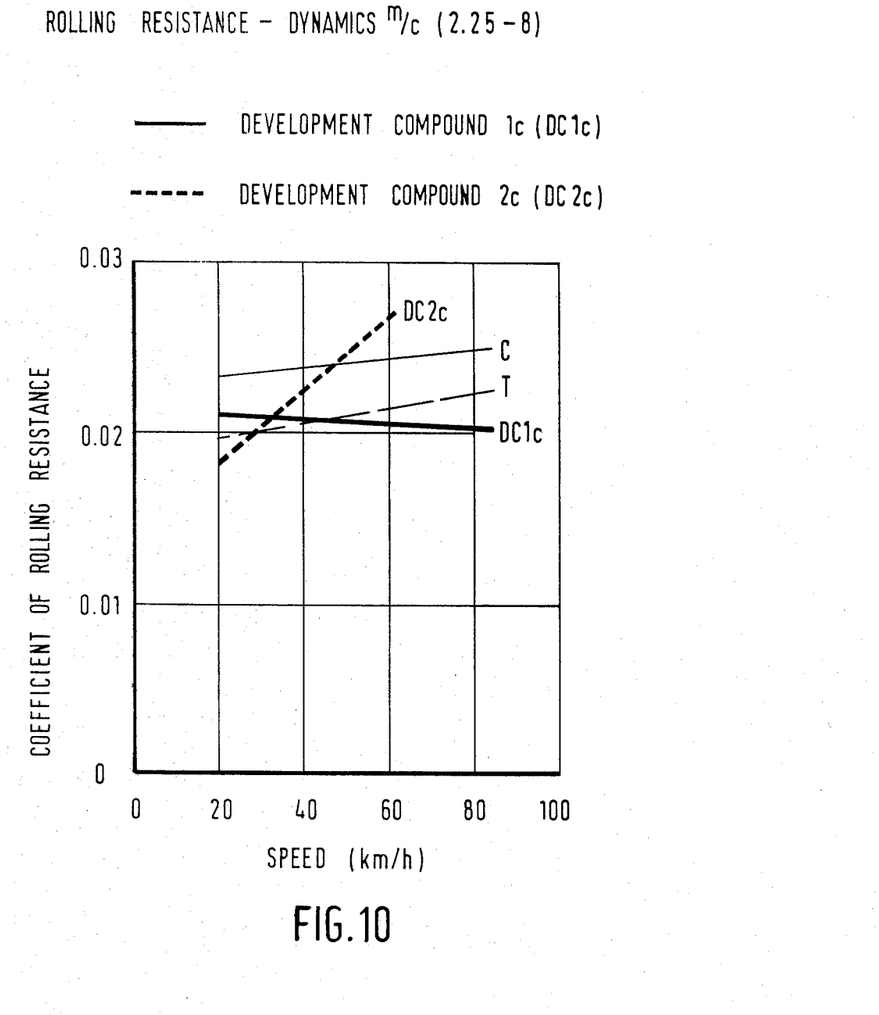
Figure 11:
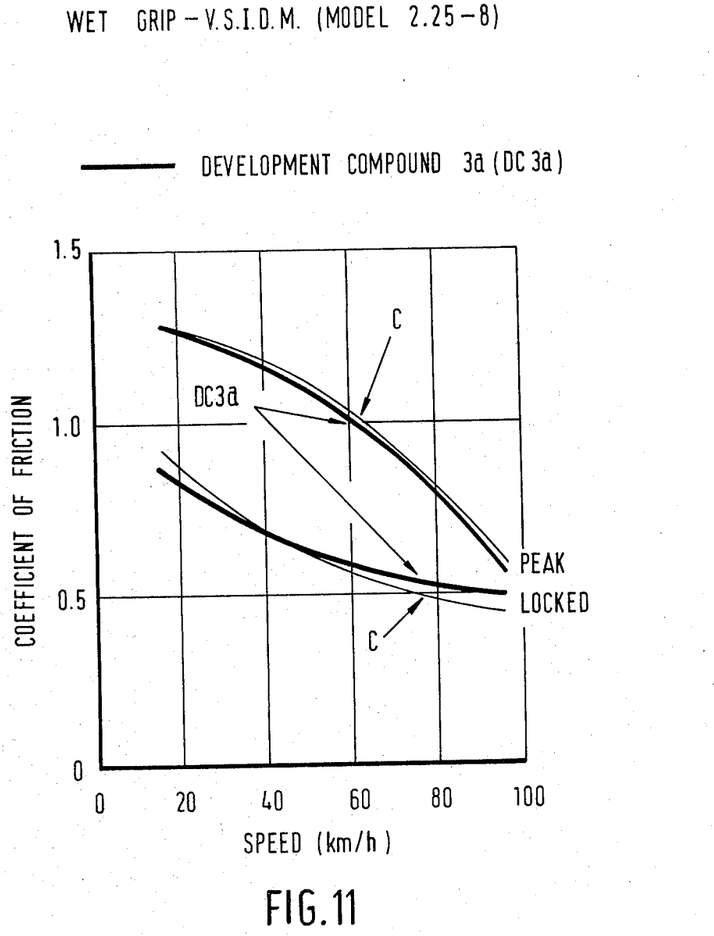
Figure 12:
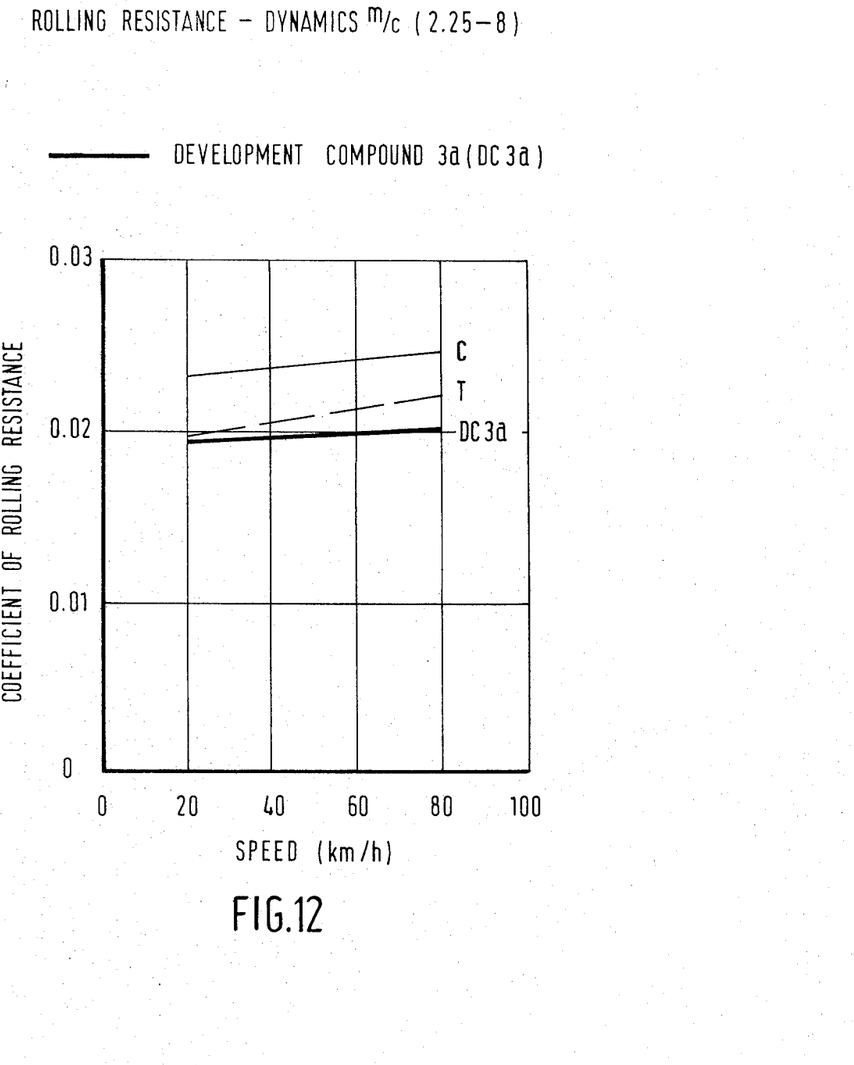
Figure 13:
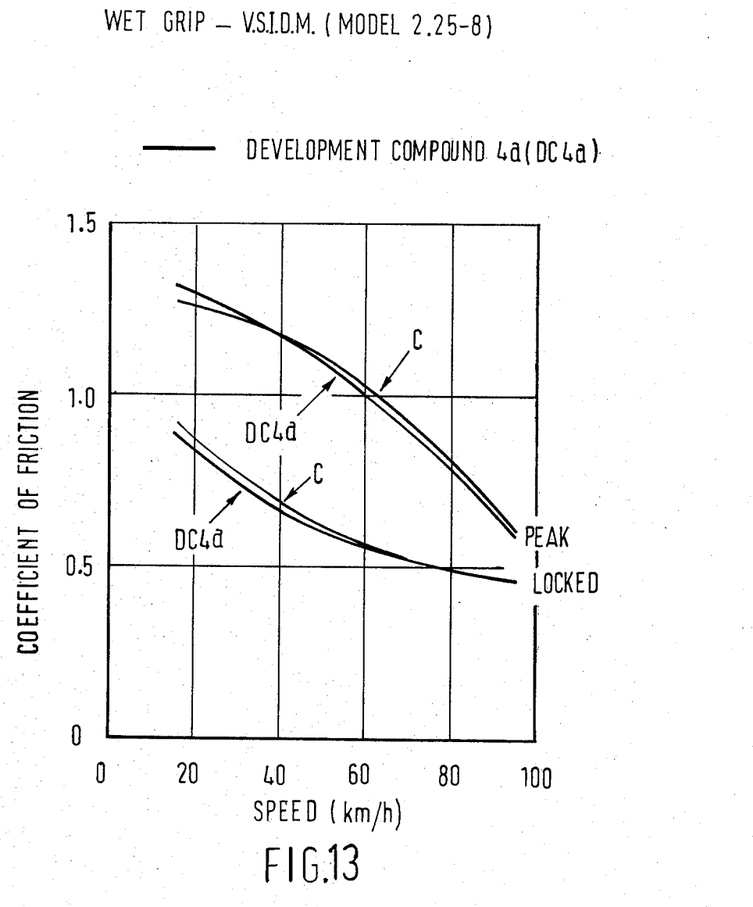
Figure 14:
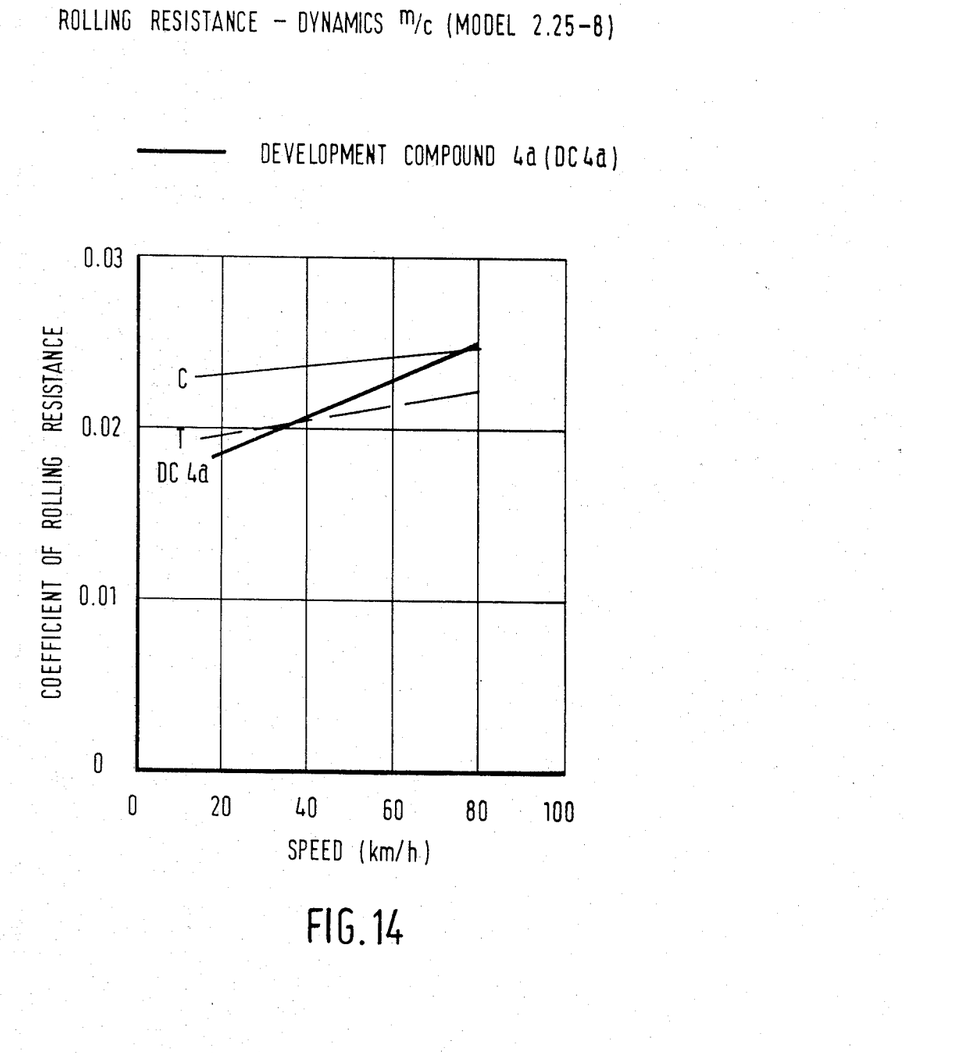

The results obtained from the tests are shown graphically in FIGS. 1 to 4 (relating to Example 1), FIGS. 5 and 6 (relating to Example 2), FIGS. 7 and 8 (Example 3), FIGS. 9 and 10 (Examples 4 and 7), FIGS. 11 and 12 (Example 5) and FIGS. 13 and 14 (Example 6).

In the drawings the thick lines relate to the results obtained with the tires whose treads comprise vulcanised elastomer compositions of the stated Examples of the invention. The thin lines marked "C" or "T" relate respectively to the results obtained with tires whose treads comprise vulcanised comparative elastomer compositions (C or T). Thos two comparative elastomer compositions were obtained by blending together the ingredients shown below.

| Comparative Composition T | |
|---|---|
| SMR-20 natural rubber | 80.00 |
| IR 309 (low cis-polyisoprene) | 20.00 |
| N375 black | 52.50 |
| Santocure MOR | 0.70 |
| PVI-50 | 0.40 |
| Stearic acid | 2.00 |
| Zinc oxide | 4.00 |
| Dutrex RT oil | 6.00 |
| Arrconnox GP | 2.00 |
| IPPD | 0.50 |
| Paraffin wax | 1.00 |
| 40 mesh rubber crumb | 5.00 |
| Sulphur | 2.50 |
| | 176.60 |

| Comparative Composition C | |
|---|---|
| OEP 1712 | 77.50 |
| SBR 1502 | 22.50 |
| N339 black | 60.00 |
| Dutrex RT oil | 5.00 |
| Process Oil | 5.00 |
| Arrconnox GP | 1.33 |
| IPPD | 0.75 |
| Zinc oxide (indirect) | 2.50 |
| Stearic acid | 1.00 |
| Sulphur | 1.75 |
| MBS | 1.00 |
| Vulcatard A vulcanisation retarder | 0.40 |
| 40 mesh rubber crumb | 5.00 |
| | 183.73 |

The composition of Example 7 was also tested as the vulcanised tread compound of 155R 13 CB 116 radial tyres fitted to a Ford Escort RS 2000 motor car using front wheel braking.

The road grip (locked wheel friction and peak friction) was measured on a wet Delugrip road surface. The rolling resistance was measured using the dynamics machine referred to in the previous paragraph and using, as in the tests described in thar paragraph, a load of 320 kg. The results obtained from the tests are shown in the following tables. The figures for the wheel friction are expressed as percentages of the figures obtained using as tread composition the comparative composition 'C' described above.

| | Friction on wet Delugrip surface | |
|---|---|---|
| | Wheel friction value | |
| Speed (miles/hour) | Peak Friction | Locked Wheel friction |
| 30 (48 km/hour) | 82 | 100 |
| 40 (64 km/hour) | 82 | 100 |
| 50 (80 km/hour) | 100 | 100 |

| | Rolling resistance | | |
|---|---|---|---|
| Composition | Coefficient of rolling resistance | Standard deviation | Temperature (°C.) |
| (a) Composition 'C' | 0.0138 | 0.0005 | 28 |
| (b) Composition 'C' | 0.0151 | — | 20 |
| (c) Composition of Example 7 | 0.0127 | 0.00048 | 20 |
| (d) Composition of Example 7 | 0.0118 $\mp$ 0.001 | — | 31 |

Results (a) and (c) are each the average of results obtained from tests at 20, 40, 60 and 80 km/hour. Result (b) is an estimated value obtained using the result 0.0133±0.001 for the composition of Examle 7 at one speed at 20° C.

Having now described our invention, what we claim is:

1. An elastomer composition which when vulcanized can be used to give good grip on wet road surfaces and low frictional resistance to rolling on road surfaces in tires whose tread contains the vulcanized composition comprising
    a blend of a natural rubber and a rubbery styrene-butadiene copolymer each having a glass transition temperature of no greater than minus 50° C. and
    a polyisobutylene having a viscosity average molecular weight of at least 250,000, said composition containing substantially no polybutadiene wherein said natural rubber, said rubber-styrene copolymer, and said polyisobutylene are present in quantities sufficient to yield a vulcanized composition displaying good grip on wet road surfaces and low frictional resistance to rolling on road surfaces in tires whose treads contain the vulcanized composition.

2. An elastomer composition according to claim 1, in which the polyisobutylene is present in an amount of at least 40% by weight based on the total weight of said natural rubber and rubbery styrene-butadiene copolymer.

3. An elastomer composition according to claim 2, in which said amount is at least 50%.

4. An elastomer composition according to claim 1, in which the polyisobutylene is present in an amount in the range of from 40% to 150% by weight of the natural rubber and rubbery styrene-butadiene copolymer.

5. An elastomer composition according to claim 4, in which said amount is in the range from 40% to 100% by weight of the natural rubber and rubbery styrene-butadiene copolymer.

6. An elastomer composition according to claim 1, in which the polyisobutylene is one having a molecular weight in the range from 1,060,000 to 1,440,000.

7. An elastomer composition according to claim 1, in which the natural rubber is in an amount in the range from 65% to 85% and the styrene-butadiene copolymer is in a corresponding amount in the range from 35% to 15% of the to al weight of the natural rubber and said copolymer.

8. An elastomer composition according to claim 7, in which the natural rubber is in an amount in the range from 70% to 80% and said copolymer is in a corresponding amount in the range 30% to 20%.

9. An elastomer composition according to claim 1, which contains a polymer having a high glass transition temperature of ambient temperature or higher temperature in an amount of from 3% to 20% by weight of the natural rubber, rubbery styrene-butadiene copolymer and polyisobutylene.

10. An elastomer composition according to claim 9, in which said polymer having a high glass transition temperature is a styrene-butadiene copolymer having a styrene content in the range from 50% to 90% by weight.

11. An elastomer composition according to claim 10, in which said styrene content is in the range from 80% to 90% by weight.

12. A vulcanised composition obtained by vulcanising an elastomer composition claimed in claim 1.

13. A tyre whose tread comprises a material obtained by vulcanising an elastomer composition claimed in claim 1.

* * * * *